United States Patent
Luo et al.

(10) Patent No.: US 8,520,718 B2
(45) Date of Patent: Aug. 27, 2013

(54) PUSCH TRANSMIT DELIVERY SCHEME SELECTION

(75) Inventors: Tao Luo, San Diego, CA (US); Xiliang Luo, Northridge, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 12/817,516

(22) Filed: Jun. 17, 2010

(65) Prior Publication Data

US 2011/0143696 A1 Jun. 16, 2011

Related U.S. Application Data

(60) Provisional application No. 61/218,249, filed on Jun. 18, 2009.

(51) Int. Cl.
*H04B 1/00* (2006.01)

(52) U.S. Cl.
USPC .......................... 375/147; 375/267; 375/299

(58) Field of Classification Search
USPC ............... 375/141, 147, 260, 267, 295, 299, 375/14
See application file for complete search history.

(56) References Cited

U.S. PATENT DOCUMENTS

| | | | |
|---|---|---|---|
| 7,095,709 B2 | 8/2006 | Walton et al. | |
| 7,266,157 B2 | 9/2007 | Sim et al. | |
| 8,050,358 B2 * | 11/2011 | Kim et al. | 375/299 |
| 2010/0041350 A1 * | 2/2010 | Zhang et al. | 455/101 |

FOREIGN PATENT DOCUMENTS

| | | |
|---|---|---|
| EP | 1516441 A1 | 3/2005 |
| EP | 1994665 A1 | 11/2008 |
| TW | 200408216 | 5/2004 |
| TW | 200735560 | 9/2007 |

OTHER PUBLICATIONS

International Search Report and Written Opinion -PCT/US2010/039235, International Search Authority—European Patent Office—Sep. 30, 2010.
Mitsubishi Electric: "Comparison of uplink 2-Tx transmit diversity schemes for LTE-Advanced" 3GPP Draft; R1-092004, 3rd Generation Partnership Project (3GPP), Mobile Competence Centre ; 650, Route Des Lucioles ; F-06921 Sophia-Antipolis Cedex ; France, no. San Francisco, USA; 20090428, Apr. 28, 2009, XP050339474.
Nortel: "Discussion on Transmit diversity for PUSCH in LTE-A" 3GPP Draft; R1-091924(Nortel-LTEA_UL_TXD_PUSCH), 3rd Generation Partnership Project (3GPP), Mobile Competence Centre ; 650, Route Des Lucioles ; F-06921 Sophia-Antipolis Cedex ; France, no. San Francisco, USA; 20090428, Apr. 28, 2009, XP050339408.

(Continued)

*Primary Examiner* — Dac Ha
(74) *Attorney, Agent, or Firm* — Liem T. Do

(57) ABSTRACT

Certain aspects of the present disclosure relate to a method for uplink wireless communications. In one aspect, a diversity scheme may be selectively and adaptively applied to an uplink transmission based on a determination of whether the uplink transmission comprises one or more orphan symbols. According to an aspect, the determination is made based on whether a sounding reference signal is received in the uplink subframe and whether the uplink subframe is configured with a normal or extended cyclic prefix.

36 Claims, 11 Drawing Sheets

(56) References Cited

OTHER PUBLICATIONS

Qualcomm Europe: "PUSCH Transmit Diversity" 3GPP Draft; R1-092066_PUSCH_TX_Diversity, 3rd Generation Partnership Project (3GPP), Mobile Competence Centre ; 650, Route Des Lucioles ; F-06921 Sophia-Antipolis Cedex ; France, no. San Francisco, USA; 20090428, Apr. 28, 2009, XP050339523.
Taiwan Search Report—TW099119959—TIPO—Apr. 19, 2013.

* cited by examiner

PUSCH TRANSMIT DELIVERY SCHEME SELECTION

CLAIM OF PRIORITY UNDER 35 U.S.C. §119

The present Application for Patent claims benefit of Provisional Application Ser. No. 61/218,249 filed Jun. 18, 2009 and assigned to the assignee hereof and hereby expressly incorporated by reference herein.

BACKGROUND

1. Field

Certain aspects of the present disclosure generally relate to wireless communications and, more particularly, to a method for facilitating uplink wireless communication.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where Ns $\leq$ min $\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects provide a method for wireless communications. The method generally includes determining if a set of symbols to be transmitted in an uplink subframe comprises one or more orphan symbols, selecting, from a plurality of transmit diversity schemes, at least one transmit diversity scheme based on the determination, processing the set of symbols using the selected transmit diversity scheme, and transmitting the processed symbols in the uplink subframe via a plurality of transmit antennas.

Certain aspects provide a method for wireless communications. The method generally includes receiving, from a user equipment (UE), a set of symbols in an uplink subframe, determining at least one transmit diversity scheme selected by the UE for processing the set of symbols based on whether the set of symbols, prior to processing, comprised one or more orphan symbols, and processing the set of symbols using a receive diversity scheme corresponding to the selected transmit diversity scheme.

Certain aspects provide an apparatus for wireless communications. The apparatus generally includes logic for determining if a set of symbols to be transmitted in an uplink subframe comprises one or more orphan symbols, logic for selecting, from a plurality of transmit diversity schemes, at least one transmit diversity scheme based on the determination, logic for processing the set of symbols using the selected transmit diversity scheme, and logic for transmitting the processed symbols in the uplink subframe via a plurality of transmit antennas.

Certain aspects provide an apparatus for wireless communications. The apparatus generally include logic for receiving, from a user equipment (UE), a set of symbols in an uplink subframe, logic for determining at least one transmit diversity scheme selected by the UE for processing the set of symbols based on whether the set of symbols, prior to processing, comprised one or more orphan symbols, and logic for processing the set of symbols using a receive diversity scheme corresponding to the selected transmit diversity scheme.

Certain aspects provide an apparatus for wireless communications. The apparatus generally means for determining if a set of symbols to be transmitted in an uplink subframe comprises one or more orphan symbols, means for selecting, from a plurality of transmit diversity schemes, at least one transmit diversity scheme based on the determination, means for processing the set of symbols using the selected transmit diversity scheme, and means for transmitting the processed symbols in the uplink subframe via a plurality of transmit antennas.

Certain aspects provide an apparatus for wireless communications. The apparatus generally means for receiving, from a user equipment (UE), a set of symbols in an uplink subframe, means for determining at least one transmit diversity scheme selected by the UE for processing the set of symbols based on whether the set of symbols, prior to processing, comprised one or more orphan symbols, and means for processing the set of symbols using a receive diversity scheme corresponding to the selected transmit diversity scheme.

Certain aspects provide a computer-program product for wireless communications, comprising a computer readable medium having instructions stored thereon, the instructions being executable by one or more processors. The instructions generally include instructions for determining if a set of symbols to be transmitted in an uplink subframe comprises one or more orphan symbols, instructions for selecting, from a plurality of transmit diversity schemes, at least one transmit diversity scheme based on the determination, instructions for processing the set of symbols using the selected transmit diversity scheme, and instructions for transmitting the processed symbols in the uplink subframe via a plurality of transmit antennas.

Certain aspects provide a computer-program product for wireless communications, comprising a computer readable medium having instructions stored thereon, the instructions being executable by one or more processors. The instructions generally include instructions for receiving, from a user equipment (UE), a set of symbols in an uplink subframe, instructions for determining at least one transmit diversity scheme selected by the UE for processing the set of symbols based on whether the set of symbols, prior to processing, comprised one or more orphan symbols, and instructions for processing the set of symbols using a receive diversity scheme corresponding to the selected transmit diversity scheme.

Certain aspects provide an apparatus for wireless communications, comprising at least one processor and a memory coupled to the at least one processor. The at least one processor is generally configured to determine if a set of symbols to be transmitted in an uplink subframe comprises one or more orphan symbols, select, from a plurality of transmit diversity schemes, at least one transmit diversity scheme based on the determination, process the set of symbols using the selected transmit diversity scheme, and transmit the processed symbols in the uplink subframe via a plurality of transmit antennas.

Certain aspects provide an apparatus for wireless communications, comprising at least one processor and a memory coupled to the at least one processor. The at least one processor is generally configured to receive, from a user equipment (UE), a set of symbols in an uplink subframe, determine at least one transmit diversity scheme selected by the UE for processing the set of symbols based on whether the set of symbols, prior to processing, comprised one or more orphan symbols, and process the set of symbols using a receive diversity scheme corresponding to the selected transmit diversity scheme.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
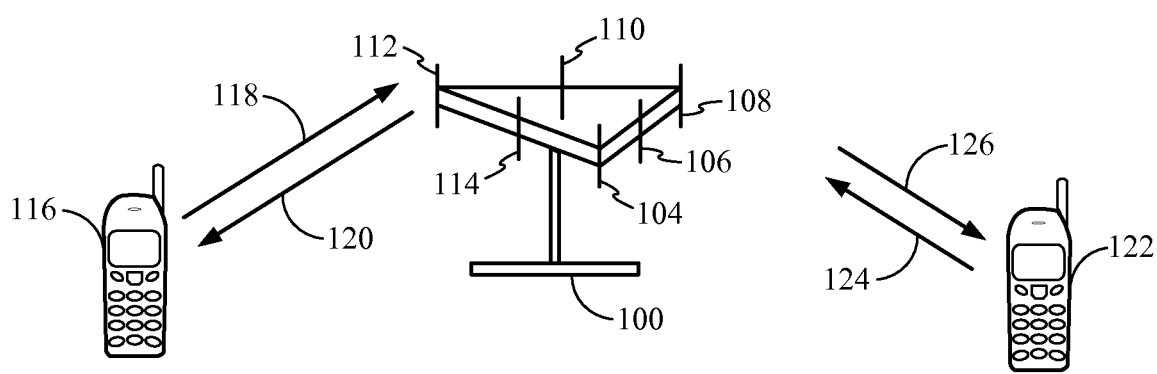
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an evolved Node B (eNode B), or some other terminology. An access terminal may also be called an access terminal, user equipment (UE), a wireless communication device, terminal, access terminal or some other terminology.

Figure 2:
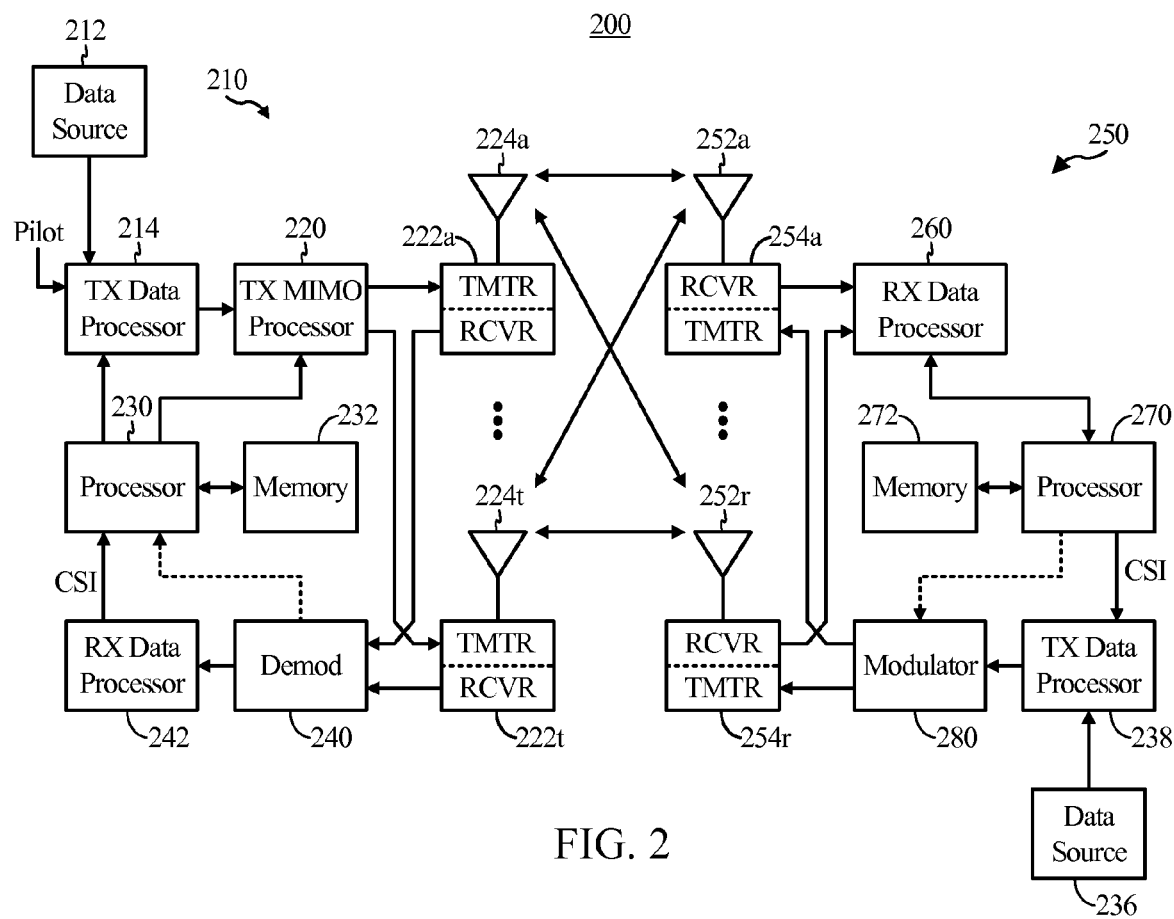
FIG. 2 illustrates a block diagram of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters (TMTR) 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 3:
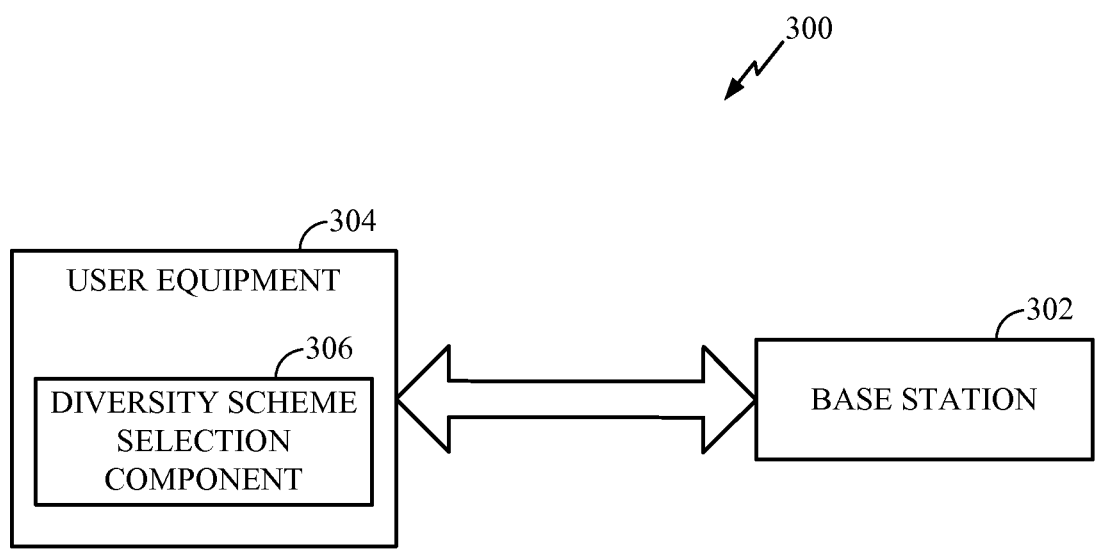
FIG. 3 illustrates a block diagram of an example system that facilitates transmit diversity in accordance with an aspect of the disclosed subject matter.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control—
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User—
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel Pusch Transmit Delivery Scheme Selection FIG. 3 illustrates an example system 300 that may implement transmit diversity in accordance with certain aspects of the present disclosure.

The system 300 includes a base station 302 (e.g., access point, Node B, eNode B, etc.) that can communicate with user equipment (UE) 304 (e.g., mobile station, mobile device, and/or any number of disparate devices (not shown)). The base station 302 can transmit information to the user equipment 304 over a forward link channel or downlink channel; further, base station 302 can receive information from the user equipment 304 over a reverse link channel or uplink channel. Moreover, system 300 can be a MIMO system. Additionally, the system 300 can operate in an OFDMA wireless network (e.g., 3GPP, 3GPP2, 3GPP LTE . . . ), among others. Also, the components and functionalities shown and described below in the base station 302 can be present in the user equipment 304 and vice versa, in one example.

The user equipment 304 may include diversity scheme selection (DSS) component 306. In accordance with one embodiment, DSS component 306 may enable adaptive selection of a Physical Uplink Shared Channel (PUSCH) transmit diversity scheme. As will be described in greater detail below, various candidate schemes for PUSCH transmit diversity include, but are not limited to, Space Frequency Block Code (SFBC), Space-Time Block Code (STBC), low Cubic Metric (CM) SFBC, Cyclic Delay Diversity (CDD), and Frequency Switched Transmit Diversity (FSTD).

As will be described later with reference to FIGS. 9-11, according to certain aspects, one or more transmit diversity schemes may be selected by a UE based on whether or not a subframe of symbols to be transmitted contains orphan symbols.

Figure 4:
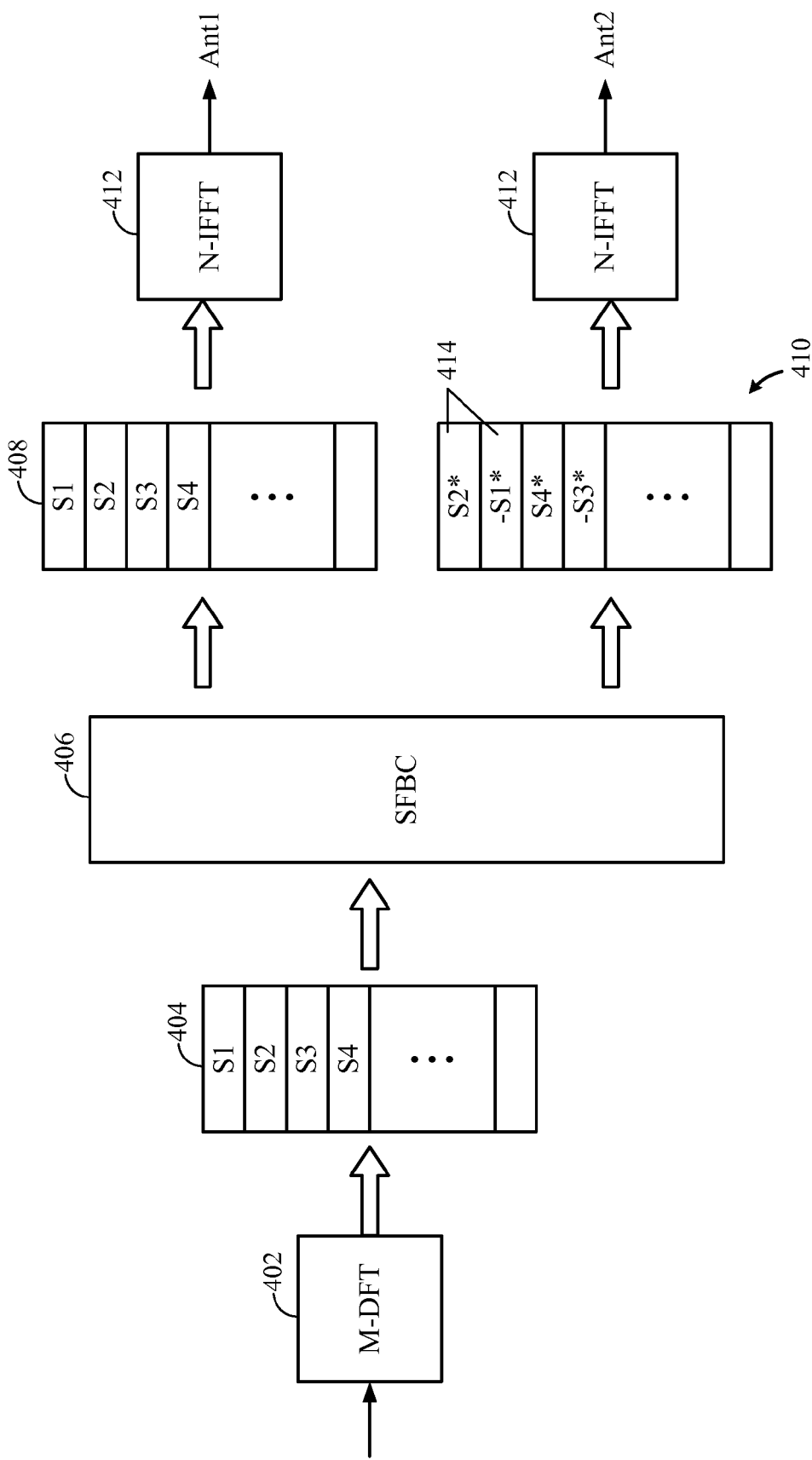
FIG. 4 illustrates a block diagram of a transmit diversity scheme in accordance with an aspect of the disclosure.

FIG. 4 is a block diagram illustrating SFBC, a transmit diversity scheme that may be used in an embodiment of the present invention. SFBC is a form of an Alamouti code applied in the frequency-domain, rather than the time domain. An SFBC scheme begins when an M-point Discrete Fourier Transform (M-DFT) 402 is performed on a plurality of data symbols 404. The symbols 404 are then processed by an SFBC block 406 that encodes the symbols 404 into coded symbols 408, 410, the coded symbols may be processed by an N-subcarrier Inverse Fast Fourier Transform (N-IFFT) 412 for transmission by a plurality of transmit antennas (e.g., ANT1 and ANT2 as shown).

Two adjacent tones in a code may form an Alamouti codeword. In one aspect, the mapping of each pair to a second antenna is reverse ordered, sign reversed, and complex conjugated, as illustrated by modulation symbols 414. SFBC advantageously permits encoding to be performed within a single symbol and permits uncoded diversity to be achieved. However, when using a SFBC scheme, single-carrier waveform may not be preserved at the second transmit antenna.

Figure 5:
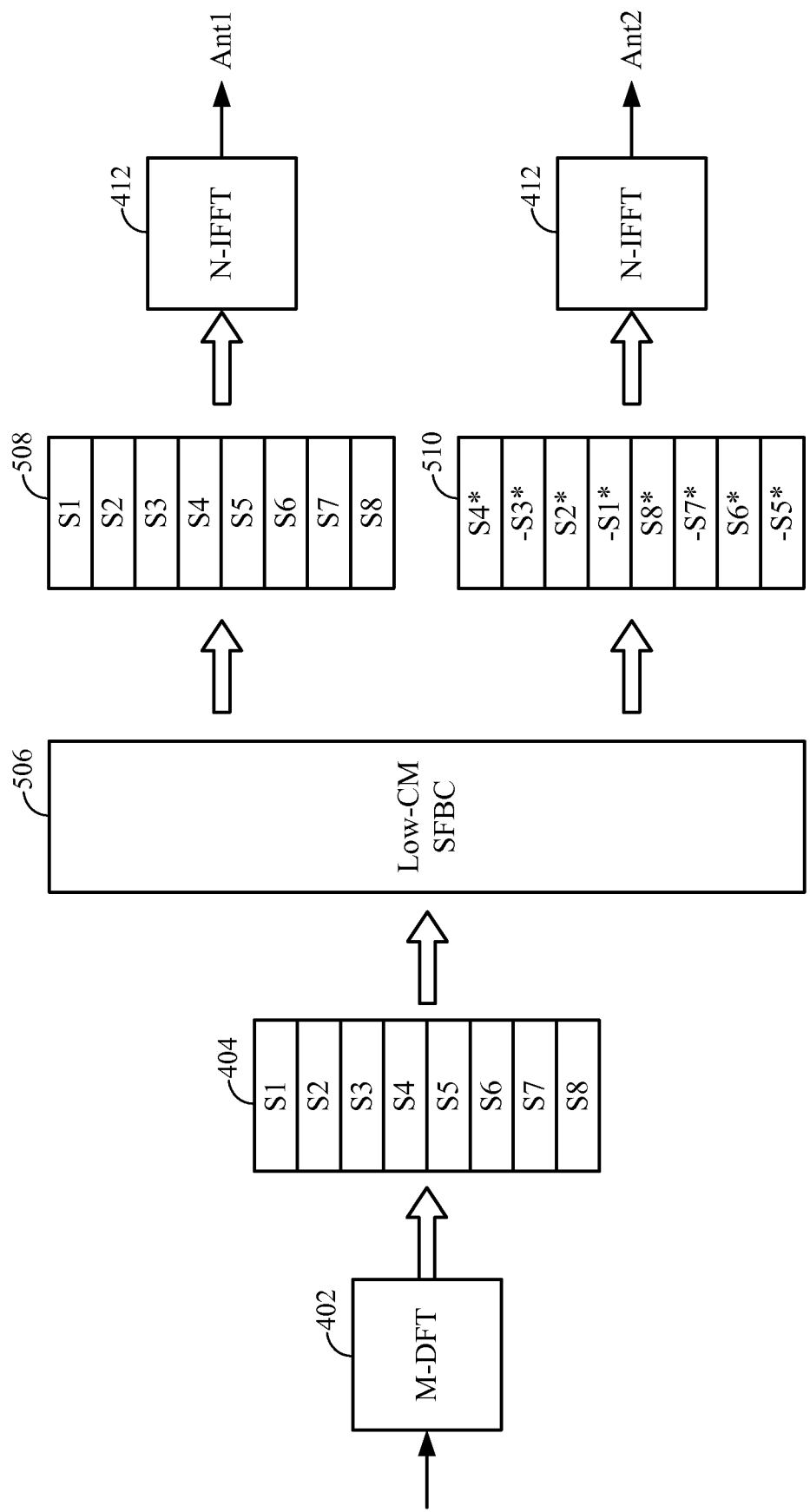
FIG. 5 illustrates a block diagram of a transmit diversity scheme in accordance with another aspect of the disclosure.

To preserve the single-carrier property at both transmit antennas, low-CM SFBC may be employed, which differs from SFBC in "tone-mapping", as shown in FIG. 5. As previously noted under SFBC, two adjacent or consecutive tones form an Alamouti codeword. In contrast, in low-CM SFBC, two distant tones may form an Alamouti codeword; the distance between two tones can be as large as half of the total number of tones occupied. In the example shown, where M=8, a low-CM SFBC operation 506 may generate codes 508 and 510 from symbols 404 where tones may be apart by four tones. Low-CM SFBC advantageously permits encoding to be performed within a single symbol, permit un-coded diversity, and preserve SC-FDM waveform at both antennas. However, there may be a performance loss compared with SFBC due to channel frequency selectivity and a minimum mean square error (MMSE) receiver may be necessary to achieve satisfactory performance.

Figure 6:
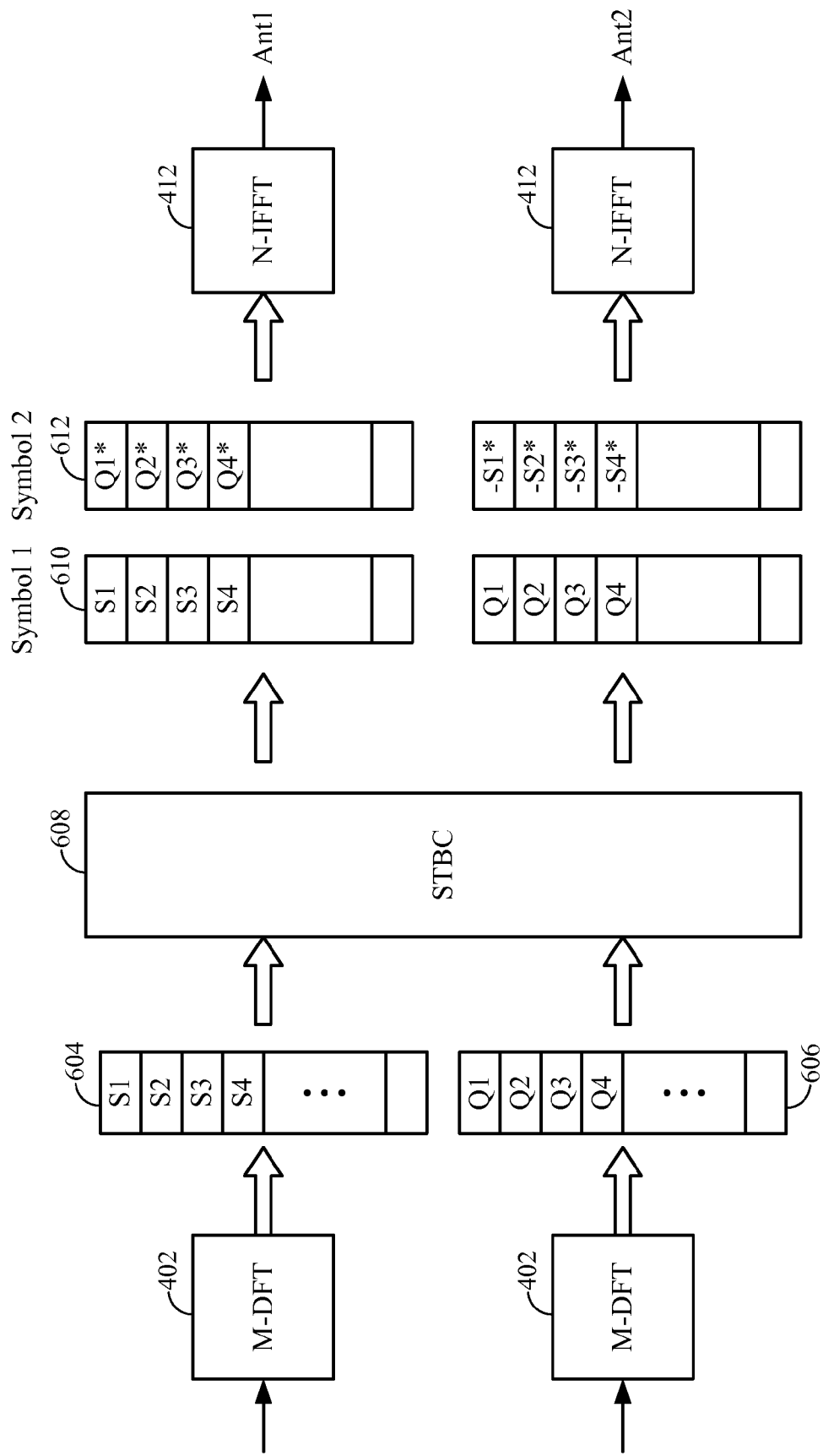
FIG. 6 illustrates a block diagram of a transmit diversity scheme in accordance with still another aspect of the disclosure.

FIG. 6 is a block diagram illustrating STBC, another diversity scheme that may be used in an embodiment of the present invention. STBC is also a form of the Alamouti code scheme, applied in the time domain rather than the frequency domain. As illustrated in FIG. 6, begins with at least two sets of symbols 604, 606 operated on by M-point DFT 402. An STBC operation 608 operates on pairs of adjacent symbols 610, 612 in the time domain. In STBC, the same tone formed over two SC-FDM symbols 610, 612 forms an Alamouti codeword. STBC advantageously preserves single-carrier waveform at both transmit antennas and achieves un-coded diversity. It is acknowledged, however, that paired SC-FDM symbols are required to perform STBC encoding. As such, orphan symbols left being unable to be paired with other symbols may require an alternative scheme.

Figure 7:
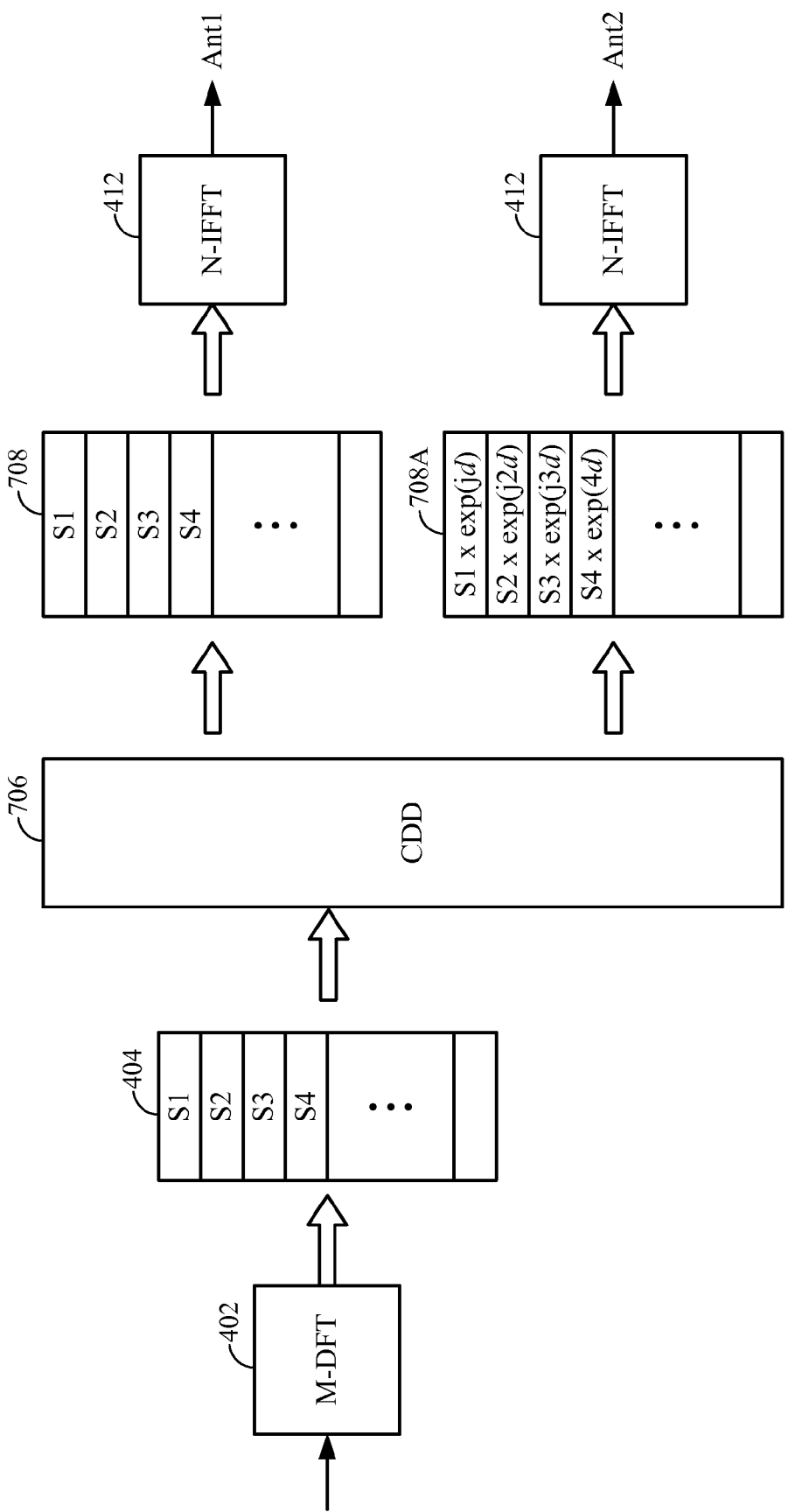
FIG. 7 illustrates a block diagram of a transmit diversity scheme in accordance with yet another aspect of the disclosure.
Figure 8:
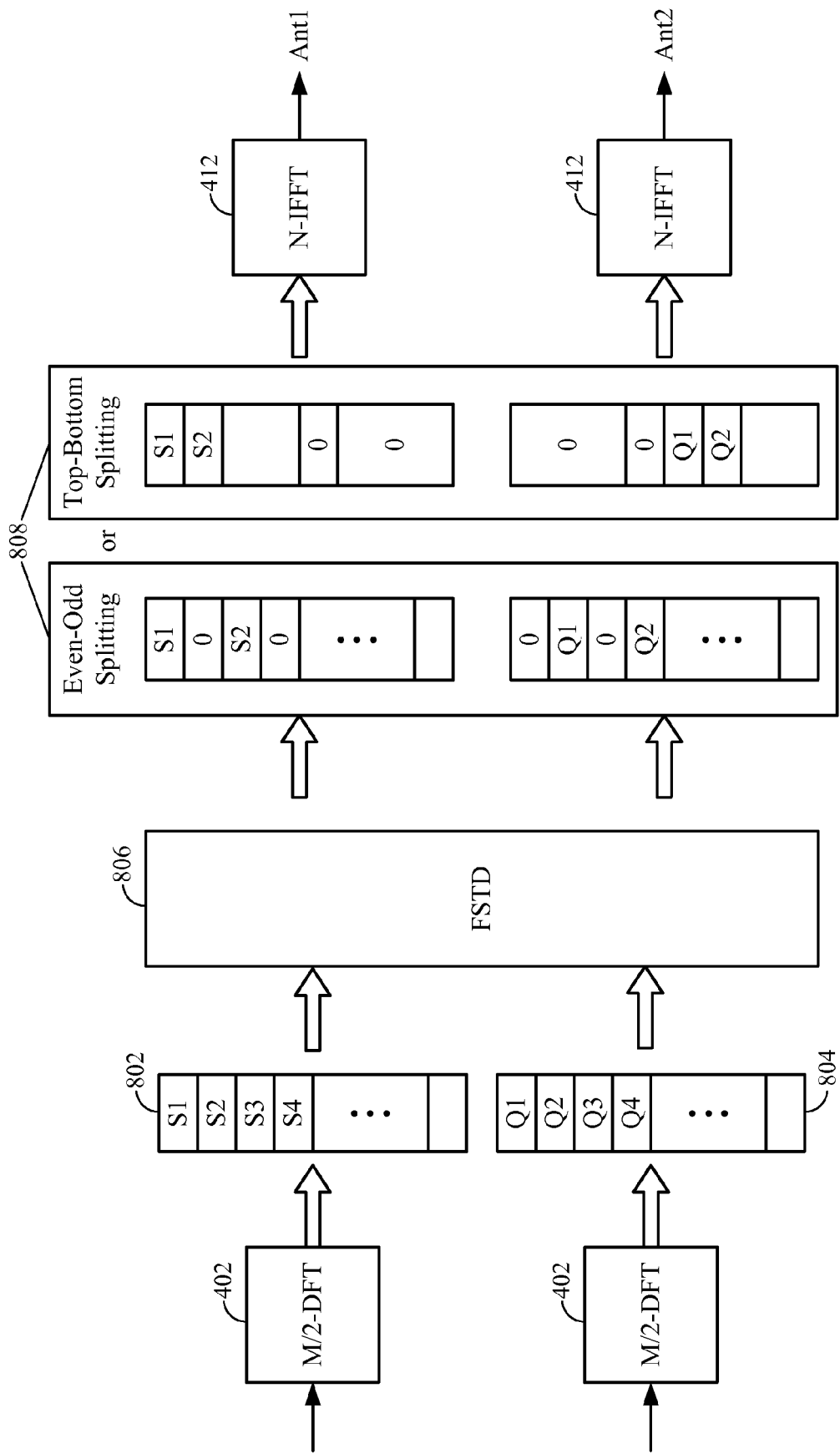
FIG. 8 illustrates a block diagram of a transmit diversity scheme in accordance with another aspect of the disclosure.

FIGS. 7 and 8 illustrate other diversity schemes, CDD and FSTD, respectively, which may be used in other embodiments of the present invention. Illustrated in FIG. 7, a CDD operation 706 involves transmitting the same set of OFDM symbols 708, 708A on a set of OFDM subcarriers from multiple transmit antennas, with a different delay on each antenna. Illustrated in FIG. 8, a FSTD operation 806 transforms symbols 802, 804 into even-odd splitting or top-bottom splitting codes 808 for each transmit antenna on a different set of subcarriers. Both CDD and FSTD may perform encoding over a single symbol, achieve diversity with coding, and advantageously preserves SC-FDM waveform at both transmit antennas. However, CDD and FSTD provide no uncoded diversity.

While the forthcoming disclosure discusses an embodiment of the present invention for use with a STBC scheme, it is acknowledged that other diversity schemes may be used instead. It is also acknowledged that while the present disclosure presents two-antenna transmit diversity, in cases where the UE has four transmit antennas, antenna virtualization may be applied and then two-transmit diversity schemes may be applied on top of the virtualized antennas. The virtualization vectors for the virtual antennas may randomly hop at the slot boundary or subframe boundary to avoid the possible correlation among the transmit antennas.

In one embodiment, a STBC diversity scheme may be employed in uplink communications. As noted above, STBC operates with respect to paired symbols (e.g., SC-FDMA symbols). However, there are several cases where an odd symbol, or an "orphan symbol", may exist such that use of STBC would be disrupted. These situations may be discussed more in detail later.

Figure 9:
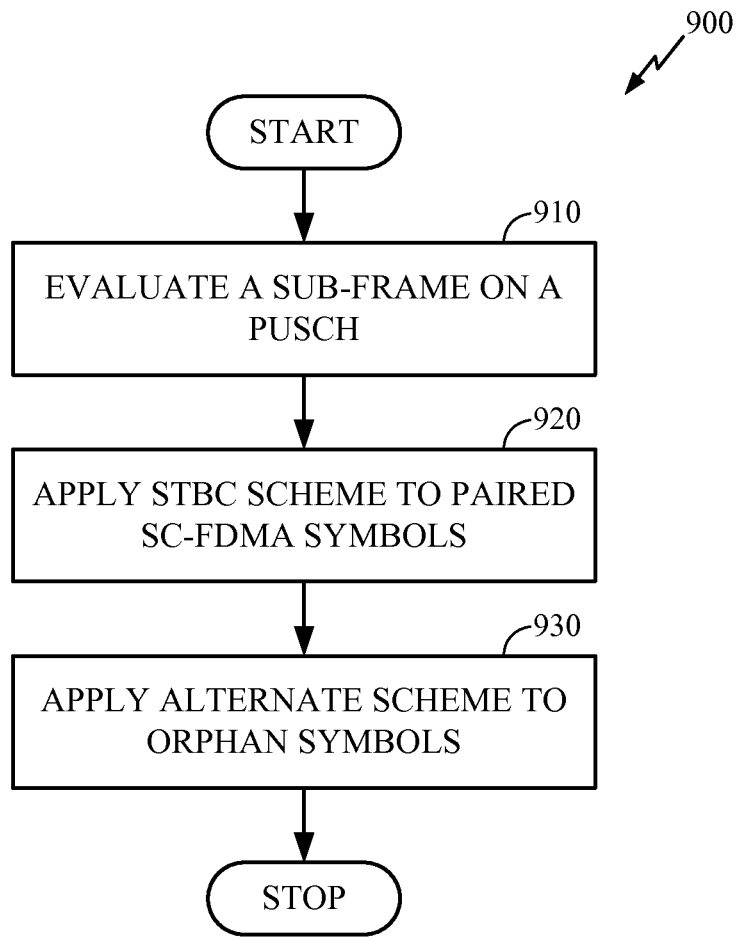
FIG. 9 illustrates a flow chart diagram of a method of adaptive selection of a diversity scheme in accordance with an aspect of the disclosure.

FIG. 9 illustrates a method 900 for adaptive selection of a diversity scheme in accordance with one embodiment. In one embodiment, the method 900 may be performed by the DSS component 306 of FIG. 3. The DSS component 306 can operate to address orphan symbols if and when they occur. More specifically, the DSS component can selectively and/or adaptively apply diversity schemes.

At 910, a subframe on a PUSCH may be evaluated. At 920, a STBC scheme may be applied to paired SC-FDMA symbols. At 930, an alternative diversity scheme that operates over single symbols, such as CDD, FSTD, and Low-CM SFBC, among others, may be applied to the orphan symbol. It is to be noted that this approach could lead to two different transmit diversity schemes within a single subframe, depending on whether an orphan symbol is present, which may increase complexity of a receiver implementation relative to alternative implementations discussed below.

Figure 10:
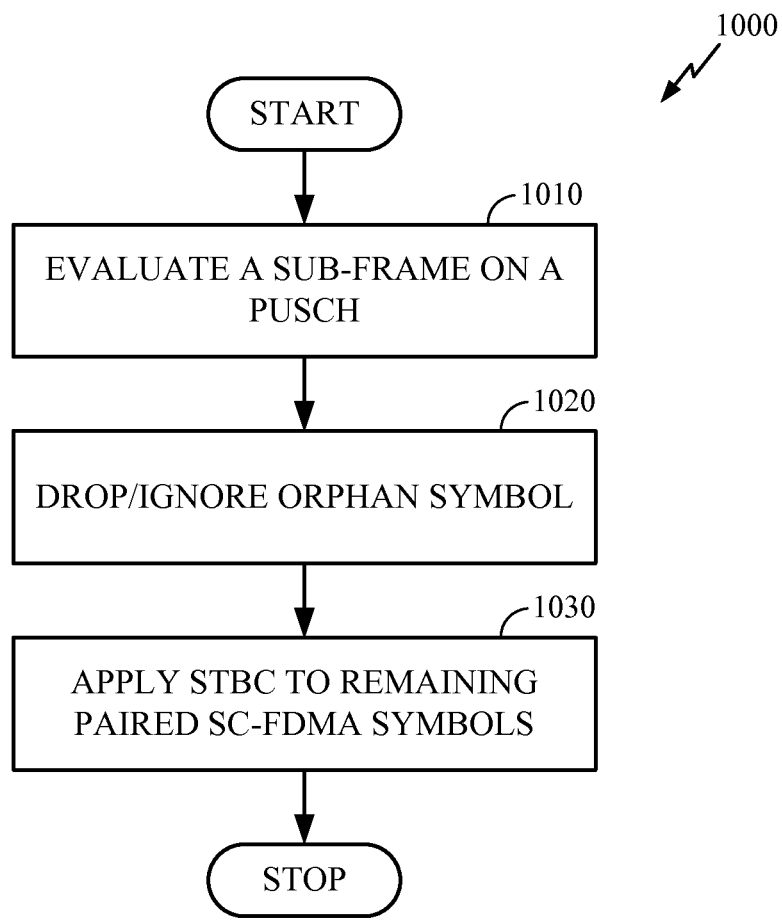
FIG. 10 illustrates a flow chart diagram of a method of adaptive selection of a diversity scheme in accordance with another aspect of the disclosure.

FIG. 10 is a flow chart diagram of an adaptive selection method 1000 in accordance with certain embodiments. At 1010, a subframe on a PUSCH may be evaluated to determine the presence or absence one or more orphan symbols. At 1020, a detected orphan symbol may be dropped from the subframe or otherwise ignored. At 1030, a STBC transmit diversity scheme may be applied to the remaining paired symbols for processing.

Figure 11:
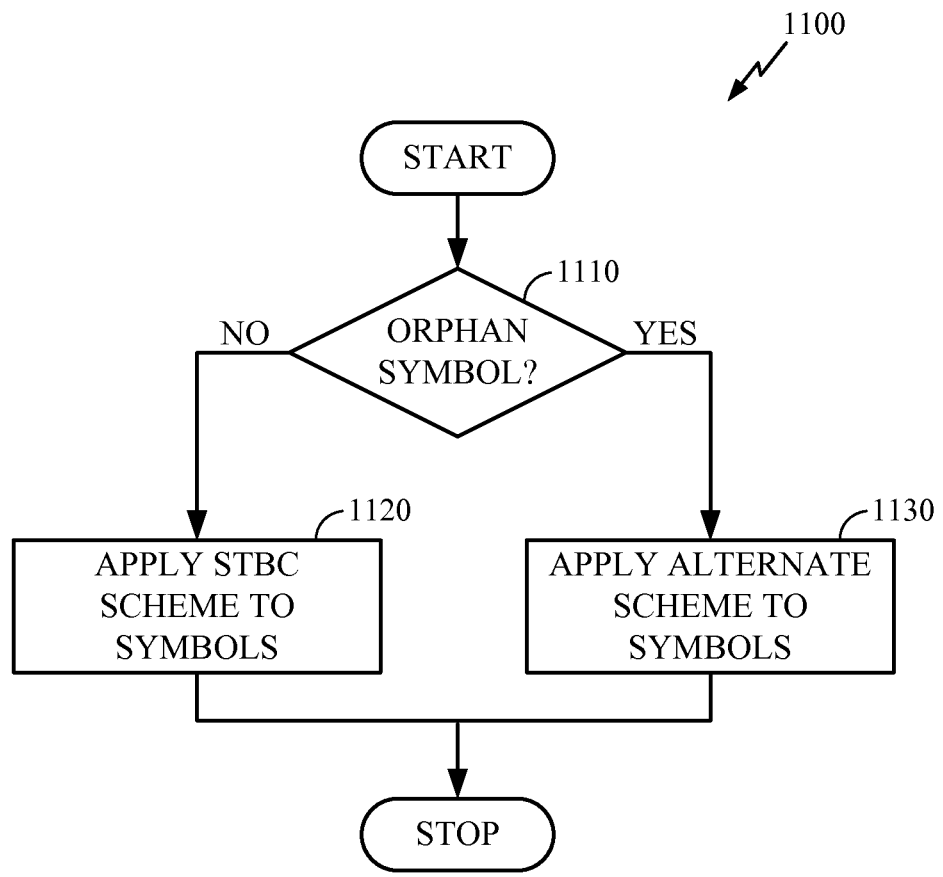
FIG. 11 illustrates a flow chart diagram of a method of adaptive selection of a diversity scheme in accordance with yet another aspect of the disclosure.

FIG. 11 is a flow chart diagram of a method of diversity scheme selection 1100 in accordance with certain embodiments. At 1110, a determination is made as to whether a set of symbols to be transmitted in an uplink subframe comprises one or more orphan symbols. An orphan symbol may be present in a subframe when the subframe includes an odd number of symbols potentially caused when a sounding reference signal (SRS) is present in the subframe or frequency hopping is employed on slot boundaries when an extended cyclic prefix is utilized. Alternatively, an orphan symbol is not present in a subframe that includes an even number of symbols since the symbols are paired.

In one example, assuming a normal cyclic prefix wherein each uplink slot includes six data SC-FDMA symbols, an orphan data symbol may occur in the second slot of the subframe when a SRS punctures one data symbol. In another example, an orphan data symbol may occur in a case of an extended cyclic prefix wherein each uplink slot includes five data SC-FDMA symbols. If there is no frequency hopping at the slot boundary, in this example, ten data symbols may exist, which are adequate for a STBC scheme (operation on pairs of symbols). An orphan symbol can occur when SRS punctures one data symbol in normal cyclic prefix configuration. In addition, when there is frequency hopping at the slot boundaries in extended cyclic prefix configuration, an orphan symbol may exist in any slot when no symbol is to be punctured due to the presence of the SRS. There may also be one orphan symbol in the first slot of the subframe when the last symbol is punctured due to SRS.

In one aspect, since the presence of SRS in a particular subframe is signaled and configured via higher layers, such as layer-3 signaling, the base station 302 may predetermine when orphan symbols will occur.

After a determination of whether an orphan symbol is present, at least one transmit diversity scheme may be selected based on the determination from a plurality of transmit diversity schemes. The set of symbols may be processed using the selected transmit diversity scheme. In one embodiment, if it is determined at 1110 that an orphan symbol is not present in the subframe ("NO"), then at 1120, a space time diversity scheme may be selected. In one embodiment, STBC may be selected and applied to or executed over all symbols.

Alternatively, if, at 1110, an orphan symbol is determined to be present in the subframe ("YES"), then, at 1130, an alternate transmit diversity scheme in which encoding is performed within a single symbol may be selected and applied over all the symbols in the subframe including the orphan symbols. In one embodiment, the alternate diversity scheme in which encoding is performed within a single symbol, rather than pairs of symbols, may include SFBC, low-CM SFBC, CDD and FSTD.

Finally, the processed symbols may be transmitted in the uplink subframe via a plurality of transmit antennas. In one embodiment, at least four transmit antennas may transmit the processed symbols in the uplink subframe.

It is to be noted that techniques herein disclosed advantageously render the receiver implementation at the base station 302 simpler because they avoid the need for the base station 302 to process two distinct diversity schemes within one subframe.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
determining if a set of symbols to be transmitted in an uplink subframe comprises one or more orphan symbols;
selecting, from a plurality of transmit diversity schemes, a transmit diversity scheme based on the determination;
processing the set of symbols using the selected transmit diversity scheme, wherein the processing includes dropping the one or more orphan symbols when the set of symbols comprises the one or more orphan symbols and applying the selected transmit diversity scheme to the remaining symbols in the set of symbols; and transmitting the processed symbols in the uplink subframe via a plurality of transmit antennas.

2. The method of claim 1, wherein the determination is made based on whether a sounding reference signal (SRS) is to be transmitted in the uplink subframe and whether the uplink subframe is configured with a normal or extended cyclic prefix.

3. The method of claim 1, wherein the selecting comprises selecting a transmit diversity scheme in which encoding is performed within a single symbol.

4. The method of claim 1, wherein
the selecting comprises selecting a space-time transmit diversity scheme if the set of symbols comprises the one or more orphan symbols.

5. The method of claim 1, wherein the transmitting comprises transmitting the processed symbols via at least four transmit antennas.

6. A method for wireless communications, comprising:
receiving, from a user equipment (UE), a set of symbols in an uplink subframe;
determining a transmit diversity scheme selected by the UE for processing the set of symbols, the transmit diversity scheme being selected by the UE based on whether an initial set of symbols comprises one or more orphan symbols, and the set of symbols being the symbols that remain from the initial set of symbols after dropping the one or more orphan symbols when the initial set of symbols comprises the one or more orphan symbols; and
processing the set of symbols using a receive diversity scheme corresponding to the selected transmit diversity scheme.

7. The method of claim 6, wherein the determination is made based on whether a sounding reference signal (SRS) is received in the uplink subframe and whether the uplink subframe is configured with a normal or extended cyclic prefix.

8. The method of claim 6, wherein the determination comprises determining that a transmit diversity scheme in which encoding is performed within a single symbol was selected by the UE if the initial set of symbols, prior to processing the set of symbols by the UE, comprised the one or more orphan symbols.

9. The method of claim 6, wherein the receiving the set of symbols comprises receiving the set of symbols from the UE via at least four antennas.

10. An apparatus for wireless communications, comprising:
means for determining if a set of symbols to be transmitted in an uplink subframe comprises one or more orphan symbols;
means for selecting, from a plurality of transmit diversity schemes, a transmit diversity scheme based on the determination;
means for processing the set of symbols using the selected transmit diversity scheme, wherein the processing includes dropping the one or more orphan symbols when the set of symbols comprises the one or more orphan symbols and applying the selected transmit diversity scheme to the remaining symbols in the set of symbols; and
means for transmitting the processed symbols in the uplink subframe via a plurality of transmit antennas.

11. The apparatus of claim 10, wherein the determination is made based on whether a sounding reference signal (SRS) is to be transmitted in the uplink subframe and whether the uplink subframe is configured with a normal or extended cyclic prefix.

12. The apparatus of claim 10, wherein the means for selecting comprises means for selecting a transmit diversity scheme in which encoding is performed within a single symbol.

13. The apparatus of claim 10, wherein
the means for selecting comprises means for selecting a space-time transmit diversity scheme if the set of symbols comprises the one or more orphan symbols.

14. The apparatus of claim 10, wherein the means for transmitting comprises means for transmitting the processed symbols via at least four transmit antennas.

15. An apparatus for wireless communications, comprising:
means for receiving, from a user equipment (UE), a set of symbols in an uplink subframe;
means for determining a transmit diversity scheme selected by the UE for processing the set of symbols, the transmit diversity scheme being selected by the UE based on whether an initial set of symbols comprises one or more orphan symbols, and the set of symbols being the symbols that remain from the initial set of symbols after dropping the one or more orphan symbols when the initial set of symbols comprises the one or more orphan symbols; and
means for processing the set of symbols using a receive diversity scheme corresponding to the selected transmit diversity scheme.

16. The apparatus of claim 15, wherein the determination is made based on whether a sounding reference signal (SRS) is received in the uplink subframe and whether the uplink subframe is configured with a normal or extended cyclic prefix.

17. The apparatus of claim 15, wherein the means for determining comprises means for determining that a transmit diversity scheme in which encoding is performed within a single symbol was selected by the UE if the initial set of symbols, prior to processing the set of symbols by the UE, comprised the one or more orphan symbols.

18. The apparatus of claim 15, wherein means for receiving comprises means for receiving the set of symbols from the UE via at least four transmit antennas.

19. A computer-program product for wireless communications, comprising a non-transitory computer readable medium having instructions stored thereon, the instructions being executable by one or more processors and the instructions comprising:
instructions for determining if a set of symbols to be transmitted in an uplink subframe comprises one or more orphan symbols;
instructions for selecting, from a plurality of transmit diversity schemes, a transmit diversity scheme based on the determination;
instructions for processing the set of symbols using the selected transmit diversity scheme, wherein the processing includes dropping the one or more orphan symbols when the set of symbols comprises the one or more orphan symbols and applying the selected transmit diversity scheme to the remaining symbols in the set of symbols; and
instructions for transmitting the processed symbols in the uplink subframe via a plurality of transmit antennas.

20. The computer-program product of claim 19, wherein the determination is made based on whether a sounding reference signal (SRS) is to be transmitted in the uplink subframe and whether the uplink subframe is configured with a normal or extended cyclic prefix.

21. The computer-program product of claim 19, wherein the instructions for selecting comprise selecting a transmit diversity scheme in which encoding is performed within a single symbol.

22. The computer-program product of claim 19, wherein the instructions for selecting comprise instructions for selecting a space-time transmit diversity scheme if the set of symbols comprises the one or more orphan symbols.

23. The computer-program product of claim 19, wherein the instructions for transmitting comprise instructions for transmitting the processed symbols via at least four transmit antennas.

24. A computer-program product for wireless communications, comprising a non-transitory computer readable medium having instructions stored thereon, the instructions being executable by one or more processors and the instructions comprising:
instructions for receiving, from a user equipment (UE), a set of symbols in an uplink subframe;
instructions for determining a transmit diversity scheme selected by the UE for processing the set of symbols, the transmit diversity scheme being selected by the UE based on whether an initial set of symbols comprises one or more orphan symbols, and the set of symbols being the symbols that remain from the initial set of symbols after dropping the one or more orphan symbols when the initial set of symbols comprises the one or more orphan symbols; and
instructions for processing the set of symbols using a receive diversity scheme corresponding to the selected transmit diversity scheme.

25. The computer-program product of claim 24, wherein the determination is made based on whether a sounding reference signal (SRS) is received in the uplink subframe and whether the uplink subframe is configured with a normal or extended cyclic prefix.

26. The computer-program product of claim 24, wherein the instructions for determining comprise instructions for determining a transmit diversity scheme in which encoding is performed within a single symbol was selected by the UE if the initial set of symbols, prior to processing the set of symbols by the UE, comprised the one or more orphan symbols.

27. The computer-program product of claim 24, wherein the instructions for receiving comprise instructions for receiving the set of symbols from the UE via at least four transmit antennas.

28. An apparatus for wireless communications, comprising:
at least one processor configured to:
determine if a set of symbols to be transmitted in an uplink subframe comprises one or more orphan symbols,
select, from a plurality of transmit diversity schemes, a transmit diversity scheme based on the determination,
process the set of symbols using the selected transmit diversity scheme, the process includes dropping the one or more orphan symbols when the set of symbols comprises the one or more orphan symbols and applying the selected transmit diversity scheme to the remaining symbols in the set of symbols, and
transmit the processed symbols in the uplink subframe via a plurality of transmit antennas; and
a memory coupled to the at least one processor.

29. The apparatus of claim 28, wherein the determination is made based on whether a sounding reference signal (SRS) is to be transmitted in the uplink subframe and whether the uplink subframe is configured with a normal or extended cyclic prefix.

30. The apparatus of claim 28, wherein the at least one processor configured to select is further configured to select a transmit diversity scheme in which encoding is performed within a single symbol.

31. The apparatus of claim 28, wherein
the at least one processor configured to select is further configured to select a space-time transmit diversity scheme if the set of symbols comprises the one or more orphan symbols.

32. The apparatus of claim 28, wherein the at least one processor configured to transmit is further configured to transmit the processed symbols via at least four transmit antennas.

33. An apparatus for wireless communications, comprising:
at least one processor configured to:
receive, from a user equipment (UE), a set of symbols in an uplink subframe,
determine a transmit diversity scheme selected by the UE for processing the set of symbols, the transmit diversity scheme being selected by the UE based on whether an initial set of symbols comprises one or more orphan symbols, and the set of symbols being the symbols that remain from the initial set of symbols after dropping the one or more orphan symbols when the initial set of symbols comprises the one or more orphan symbols, and
process the set of symbols using a receive diversity scheme corresponding to the selected transmit diversity scheme; and
a memory coupled to the at least one processor.

34. The apparatus of claim 33, wherein the determination is made based on whether a sounding reference signal (SRS) is received in the uplink subframe and whether the uplink subframe is configured with a normal or extended cyclic prefix.

35. The apparatus of claim 33, wherein the at least one processor configured to determine is further configured to determine that a transmit diversity scheme in which encoding is performed within a single symbol was selected by the UE if the initial set of symbols, prior to processing the set of symbols by the UE, comprised the one or more orphan symbols.

36. The apparatus of claim 33, wherein the at least one processor configured to receive is further configured to receive the set of symbols from the UE via at least four transmit antennas.

* * * * *